United States Patent [19]
Heinrich et al.

[11] Patent Number: 5,948,090
[45] Date of Patent: Sep. 7, 1999

[54] METHOD AND APPARATUS FOR CONTROLLING RESET OF COMPONENT BOARDS IN A COMPUTER SYSTEM

[75] Inventors: David Heinrich, Tomball; Robert Olson, The Woodlands; Siamak Tavallaei, Spring, all of Tex.

[73] Assignee: Compaq Computer Corporation, Houston, Tex.

[21] Appl. No.: 09/092,681

[22] Filed: Jun. 5, 1998

[51] Int. Cl.$^6$ .............................. G06F 1/24; G06F 13/24
[52] U.S. Cl. .................... 710/128; 710/120; 712/200
[58] Field of Search ................................. 395/208, 551, 395/201, 556, 309, 286, 306, 290, 822, 847, 841, 800.32; 371/22.31, 22.36; 364/715.01, DIG. 1, DIG. 2; 710/108, 113, 61, 120, 128; 714/48; 712/200, 201

[56] References Cited

U.S. PATENT DOCUMENTS 5,420,809  5/1995  Read et al. ....................... 364/715.01
5,790,831  8/1998  Lin et al. ................................ 395/309

*Primary Examiner*—Daniel H. Pan
*Attorney, Agent, or Firm*—Williams, Morgan & Amerson

[57] ABSTRACT

An apparatus controls a signal that indicates to a plug-in component board that it is to be connected to a 64-bit data path in a computer system. The apparatus comprises a timing circuit for receiving a reset signal and providing first and second complementary logical signals in response thereto. A selection switch receives the first and second logical signals as well as a control signal and outputs a third signal as determined by the logical level of the reset signal. A method involves generating first and second complementary signals from a reset signal, selecting between the first complementary signal and a control signal, and outputting a third signal, the logical value of the third signal being determined by the logical value of at least one of the reset signal and the control signal.

16 Claims, 4 Drawing Sheets

METHOD AND APPARATUS FOR CONTROLLING RESET OF COMPONENT BOARDS IN A COMPUTER SYSTEM

BACKGROUND OF THE INVENTION

1. Field of the Invention

This invention relates generally to controlling a PCI bus signal in a computer system, and, more particularly, to the control of a REQ64# signal used to indicate to a plug-in board the type of a system in which it is installed.

2. Description of the Related Art

The proliferation of computers has affected virtually every aspect of our personal and business lives. Whereas large mainframes and so-called minicomputers once ruled the computer world, the technology has advanced rapidly over the last 20 years. Today, due in large part to the development and sophistication of the microprocessor, personal computers in the form of desktops and laptops, for example, have completely supplanted the larger machines in many applications. Personal computers, used in stand-alone or network environments, are commonplace.

When personal-computers are ganged together into a network, typically a server, which may be a personal computer in itself, will serve as the hub of the network. Generally, each of the personal computers in the network will have access to the server. The server can be used for a variety of functions, for example, to store and run application programs for each of the personal computers in the network, or simply to function as a storehouse for data files to which each of the personal computers in the network may have access. In a network environment, the server is one of the more important elements. For example, if one of the personal computers in the network will not operate, the network as a whole will not be significantly affected. On the other hand, if the server will not operate, the information it stores, whether application programs or data files, will not be accessible to the personal computers, and a primary purpose for the existence of the network will be frustrated.

Because of the heavy reliance on computers, particularly in our business lives, computer downtime may be very costly. Downtime may result not only from unexpected hardware or software problems but from periodic maintenance as well as periodic system upgrade. When one computer in a network is inoperative, a costly situation exists. But when the server in a network is not functional, the severity of the situation is exacerbated. To the extent possible, this downtime should be minimized.

A technology, referred to as "PCI hot plug" technology, has been developed to minimize downtime associated with system maintenance, whether planned or otherwise. "PCI hot plug" capability refers to an ability to remove, add, or replace component boards of a computer without turning off the computer. For example, when a new component board is inserted into an empty slot in the running computer, various control signals are generated so that the computer will recognize the existence and type of the new board. While this technology has been employed in 32-bit systems, the control signals associated with 64-bit systems differ from those associated with the 32-bit systems. Thus, if a 64-bit board is added to a system using the current technology, the board will think it is installed in a 32-bit system instead of in a 64-bit system.

The present invention is directed to overcoming, or at least reducing the effects of, one or more of the problems set forth above.

SUMMARY OF THE INVENTION

In one aspect of the present invention, an apparatus is provided for controlling signals used to properly indicate to a component board that it is installed in a 64-bit computer system. The apparatus includes a timing circuit adapted to receive a reset signal at an input terminal and to produce first and second logical signals at first and second output terminals. The first and second logical signals are logical complements of one another; that is, one of the two signals will assume a logical low value while the other assumes a logical high value. A switch is adapted to receive the first and second logical signals and is adapted to receive a control signal. The switch will produce as an output signal either the first logical signal or the control signal, the selection being based on the logical value of at least one of the first and second logical signals.

In another aspect of the invention, a signal generation circuit is coupled to receive a reset signal and is responsive to the reset signal to produce first and second signals having opposite logical levels. A multiplexer-like circuit is coupled to receive the first and second signals and is coupled to receive a control signal. The multiplexer-like circuit is adapted to produce an output corresponding to either the first signal or the control signal as determined by the logical values of the first and second signals. The output signal logic level corresponds to the reset signal logic level if the reset signal has a logical low level and the output signal logic level corresponds to the control signal logic level if the reset signal has a logical high level.

In yet another aspect of the invention, a method is provided for controlling signals used to properly indicate to a component board that it is installed in a 64-bit computer system. The method involves generating first and second complementary signals from a reset signal, selecting between the first complementary signal and a control signal as determined by the logic level of the reset signal, and providing an output signal to indicate to the component board that it is installed in a computer system having a 64-bit data path.

BRIEF DESCRIPTION OF THE DRAWINGS

The invention may be understood by reference to the following description taken in conjunction with the accompanying drawings, in which like reference numerals identify like elements, and in which.

Figure 1:
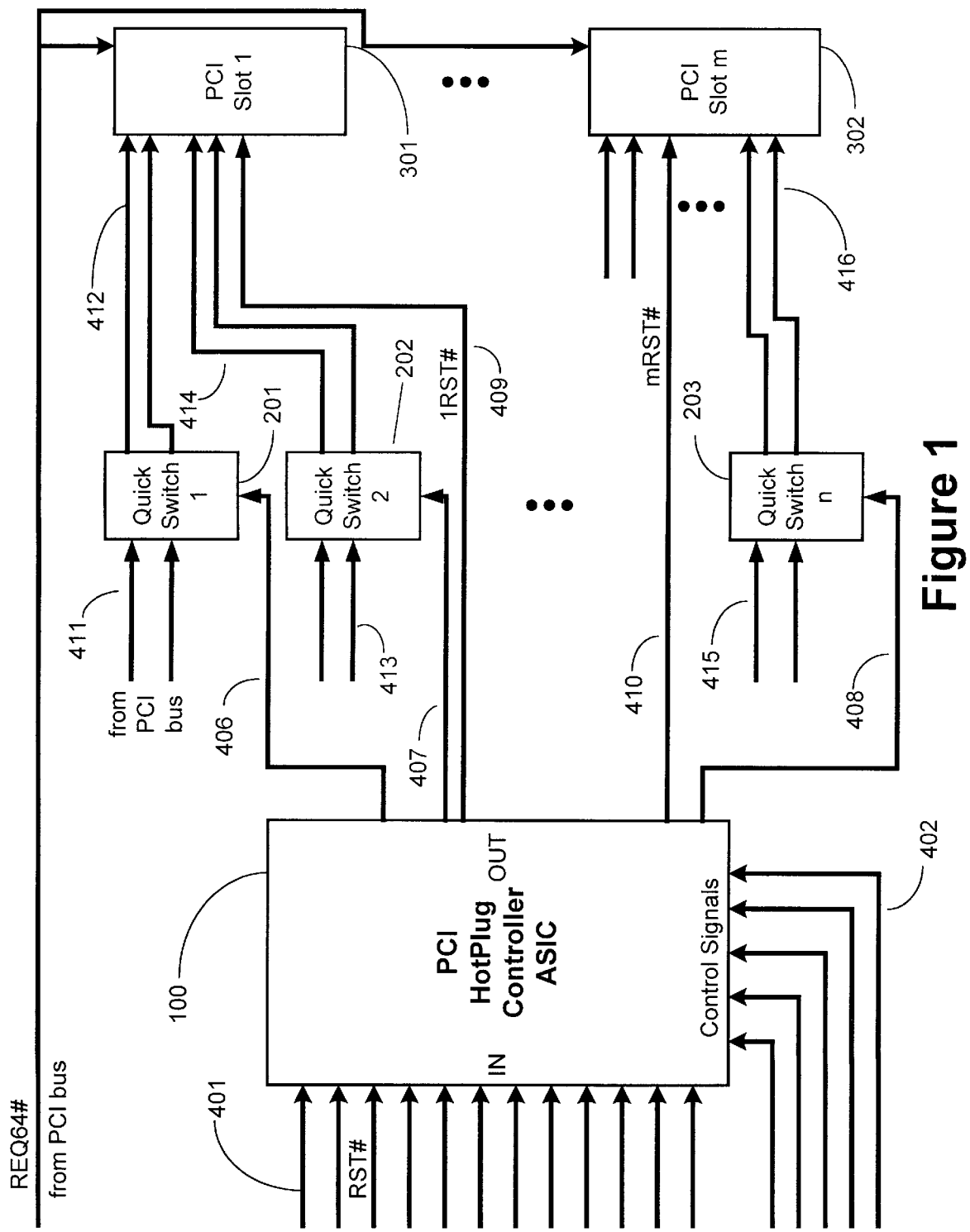
FIG. 1 is a block diagram showing various components of a 32-bit system having "PCI hot plug" capability.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 shows a block diagram of a portion of a 32-bit system in which integrated circuit component boards may be installed without turning off the computer. The ability to install IC component boards without turning off the computer is referred to as a "hot plug" capability. A computer industry specification has been developed to standardize aspects of personal computers, including servers, referred to as the Peripheral Component Interface (PCI) Specification. The PCI Specification includes a PCI Hot-Plug Specification, for example, Revision 1.0, dated Oct. 6, 1997, which is hereby incorporated by reference in its entirety.

The 32-bit system partially illustrated in FIG. 1 includes a PCI hot plug controller ASIC 100, numerous quick switches 201, 202 and 203, and several PCI slots, the several slots 1-m being represented by two slots 301 and 302. The PCI slots 301 and 302 are configured to accept 32-bit IC component boards. The quick switches 201–203 serve to isolate the individual PCI slots 301 and 302 during removal or installation of a component board. The PCI hot plug controller ASIC 100 controls the quick switches 201–203 by way of control signals on lines 406, 407 and 408, enabling the quick switches 201–203 to pass signals from the PCI bus (not shown) to the PCI slots 301 and 302 via lines 411–416. The PCI hot plug controller ASIC 100 also receives a PCI bus signal RST# on one of the lines 401 and provides a mRST# signal to each of the PCI slots (m representing the slot number) by way of lines 409 and 410. Each of the PCI slots 301 and 302 receives the REQ64# signal from the PCI bus.

The mRST# signal is asserted (low) when its associated PCI slot is to be held in reset, for example, when the slot is to be isolated from the PCI bus as when a component board is to be added to or removed from the PCI slot. As an example, the isolation of the slot 301 from the PCI bus is under control of the PCI hot plug controller ASIC 100 (which itself may be controlled by software referred to as a Hot-Plug System Driver) and the quick switches 201–202. After the slot 301 has been isolated, and any necessary maintenance has occurred, the 1RST# signal may be deasserted to once again couple the slot 301 and, perhaps, a component board, to the PCI bus. In a system that supports only a 32-bit data bus, the REQ64# signal must be high. It is maintained in a high logical state to signal to the component boards they are to use a 32-bit data path. Consequently, in the 32-bit system illustrated in FIG. 1, the RST# and REQ64# signals are unaltered in their relative timing. That is, neither the PCI hot plug controller ASIC 100 nor the quick switches 201–203 alter the relative timing between the RST# and REQ64# signals.

Figure 2:
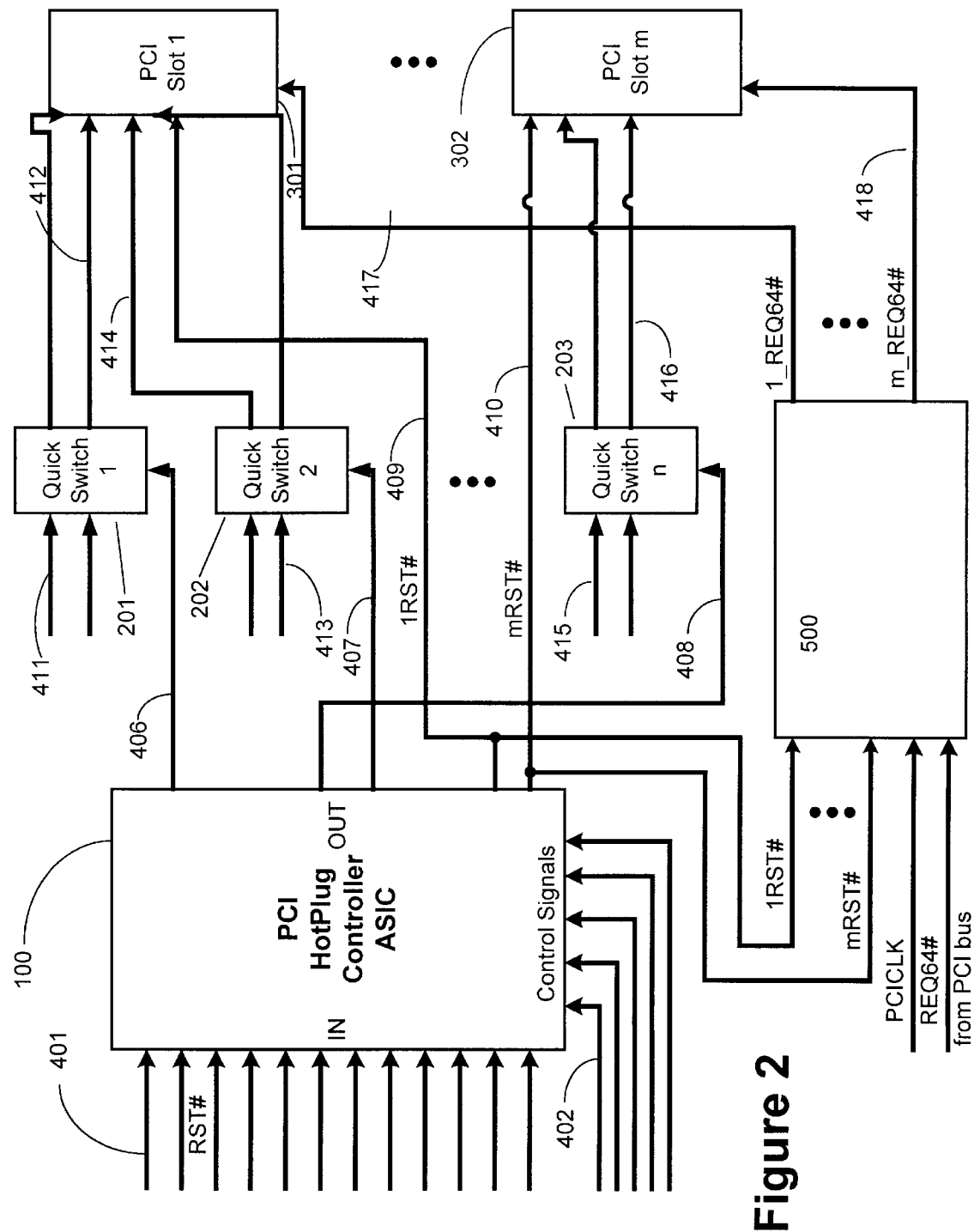
FIG. 2 is a block diagram illustrating a 64-bit system wherein the "PCI hot plug" capability has been added according to the present invention.

FIG. 2 illustrates a portion of a computer system that includes a 64-bit data path and in which 64-bit component boards may be installed and properly coupled to the 64-bit data path. In a system that includes a 64-bit data path and will accommodate 64-bit component boards, the logical status of the REQ64# signal is not always high, and its status upon deassertion of the RST# signal is important. The PCI Hot-Plug Specification, Revision 1.0, dated Oct. 6, 1997, requires that the REQ64# signal be asserted (logical low) on the rising edge of the deassertion of the RST# signal. This relative status of the signals will cause the particular PCI slot (and associated board) to use the 64-bit data path. Otherwise, the card will think it is on a 32-bit bus and only use 32 bits of the data bus. The REQ64# signal has setup and hold time requirements, shown in FIG. 3 for 5V and 3.3V systems, relative to the rising edge (deassertion) of the RST# signal.

In FIG. 2, the circuitry 500 controls the status of the REQ64# signal as required by the PCI Hot-Plug Specification for 64-bit component boards. That portion of the computer system illustrated in the block diagram of FIG. 2 includes a PCI hot plug controller ASIC 100, numerous quick switches 201–203, and several PCI slots, again represented by the two slots 301 and 302. In this system, the REQ64# signal is not coupled directly to the PCI slots as in the 32-bit system of FIG. 1, rather it is coupled to the circuitry 500, along with a PCICLK signal and the 1RST# . . . mRST# signals. The 1RST# . . . mRST# signals are provided by the PCI hot plug controller ASIC 100 as in the 32-bit case, and they are coupled directly to the PCI slots as well as to the circuitry 500. The circuitry 500 provides signals m_REQ64# (m represents the slot number) to each of the PCI slots 301 and 302 by way of lines 417 and 418 in lieu of the slots 301 and 302 receiving the REQ64# signal. The circuitry 500 controls the assertion and deassertion of the REQ64# signal relative to the mRST# signal for each slot by providing the m_REQ64# signals. As already described, controlling the relative timing of these two signals is important in a 64-bit system.

Figure 3:
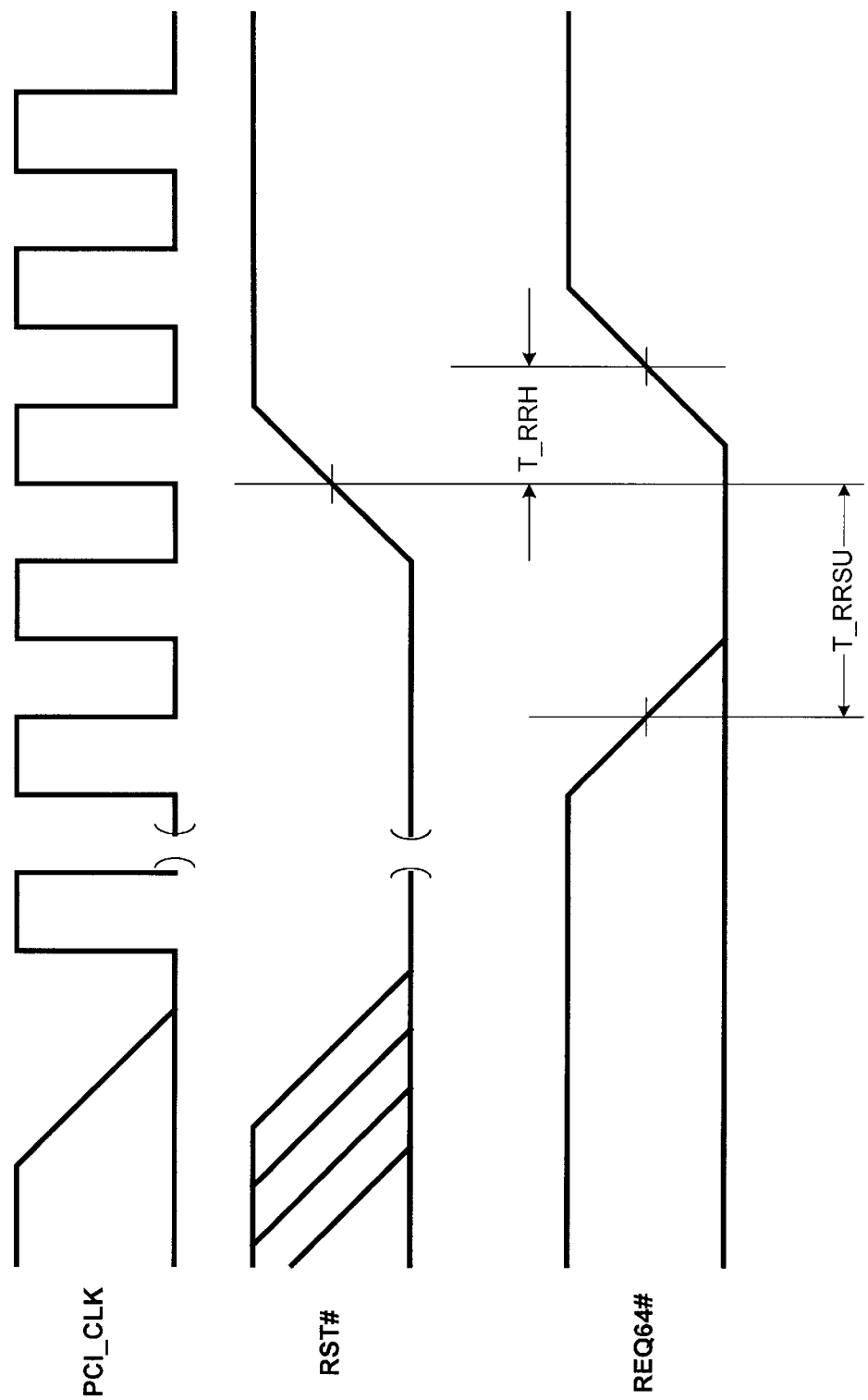
FIG. 3 shows the timing relationship between signals RST# and REQ64# to indicate to a component board that it is to be coupled to a 64-bit data path.

FIG. 3 illustrates the timing relationship needed between the RST# and REQ64# signals for proper 64-bit operation. As shown in FIG. 3, the RST# signal is driven low when a PCI slot m is to be held in reset. For example, the RST# signal is driven low (or remains low) when a previously isolated slot is to be reconnected to the PCI bus. The REQ64# signal is driven low while the RST# signal is in its asserted (low) state and must remain low during the transition of the RST# signal from its low state to its high state. As already described, the assertion and deassertion of the REQ64# signal must also comply with specified setup and hold times, as shown in FIG. 3 for 5V and 3.3V systems (and as specified in the PCI Hot Plug Specification, referenced earlier). The setup and hold times are designated in FIG. 3 as "T_RRSU" and "T_RRH", respectively. The condition of the REQ64# signal being in a low state during the rising edge of the RST# signal will cause the selected PCI slot and component board to use the 64-bit data path.

Figure 4:
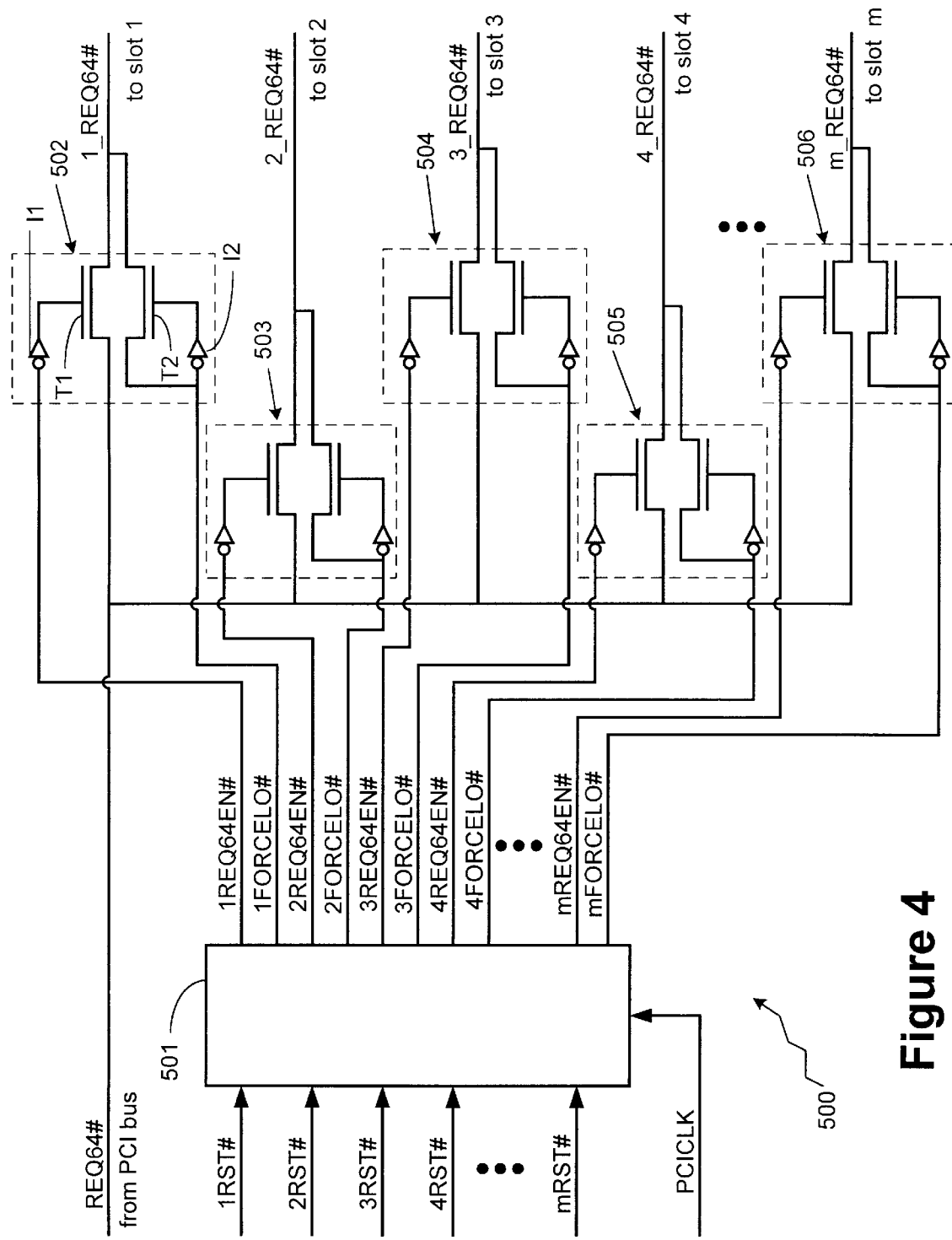
FIG. 4 is one embodiment of a circuit in which the principles of the present invention have been employed.

FIG. 4 shows details of the circuitry 500 shown in block form in FIG. 2. A PAL device 501 receives the mRST# signal (from the PCI hot plug controller ASIC 100) for each PCI slot 301 and 302 (shown in FIG. 2) to be controlled and used for a 64-bit component. The PAL device 501 also receives a PCICLK signal, which is a clocking signal from the PCI bus (not shown). The PCICLK signal clocks the mRST# signals into the PAL registers. As an output signal, the PAL device 501 yields a mREQ64EN# signal and a mFORCELO# signal for each 64-bit PCI slot. The PAL device 501 ensures that the mREQ64EN# and mFORCELO# signals always have complementary logic values. The mREQ64EN# and mFORCELO# pair of signals for each PCI slot are provided as inputs to quick switches 502, 503, 504, 505 and 506, one for each PCI slot to be controlled.

A PAL device that is suitable for use in the embodiment illustrated in FIG. 4 is part number 22V10 manufactured by Vantis Corp. The equations used for programming of the PAL device 501 shown in FIG. 4 are included in Appendix A to this specification. Those of ordinary skill in the art will understand how to program, and will be able to program, the PAL device 501 using the equations set forth in Appendix A. While the particular embodiment illustrated in FIG. 4 utilizes the single PAL device 501 in conjunction with several PCI slots, it will be evident that the PAL device or other equivalent device may be used with each PCI slot to be controlled.

One quick switch 502–506 for each PCI slot configured to receive a 64-bit component board receives the mREQ64EN# and mFORCELO# signals for its respective PCI slot. The quick switches 502–506 also receive the REQ64# signal from the PCI bus, not shown. A quick switch device suitable for use in the embodiment shown in FIG. 2 is part number SN74CBTS3306, manufactured by Texas Instruments. FIG. 4 illustrates the components of the quick switches 502–506 relevant to the present invention as embodied in the circuitry of FIG. 4. Each quick switch 502–506 includes two field-effect transistors (FETs), T1 and T2, and two inverters, I1 and I2.

To better understand the embodiment shown in FIG. 4, consider the quick switch 502. The quick switch 502 receives as input signals the mREQ64EN# and mFORCELO# signals from the PAL device 501, where m represents the PCI slot number of interest—in this example, slot 1. The quick switch 502 also receives as an input the REQ64#. The 1REQ64EN# signal is coupled to the inverter I1 of the quick switch 502, and the inverted form of the 1REQ64EN# signal controls FET T1. The 1FORCELO# signal is coupled to the inverter I2 of the quick switch 502, and the inverted form of the 1FORCELO# signal controls FET T2. The noninverted form of the 1FORCELO# signal is coupled to the drain terminal of the FET T2, while the REQ64# signal is coupled to the drain terminal of the FET T1. The source terminals of the FETs T1 and T2 are coupled together to provide an output signal from the quick switch 502, denoted generally as the m_REQ64# signal, and, in this example, the 1_REQ64# signal.

Referring to FIG. 4, one reset cycle operates as follows: the mRST# signal for the selected PCI slot is asserted. The PAL 501, in response to the mRST# signal, produces the mFORCELO# signal, whose logical state coincides with the logical state of the mRST# signal. When the mRST# signal is asserted (low), the mFORCELO# signal is logically low. The PAL 501 also produces a second signal, mREQ64EN#, whose logical state is opposite the logical state of the mRST# signal. When the mRST# signal is asserted, the mREQ64EN# signal is logically high. Hence, the mFORCELO# and mREQ64EN# signals have opposite logical states. The quick switch 502, for example, receives the complementary logical signals, 1FORCELO# and 1REQ64EN#, as well as the REQ64# signal. The 1FORCELO# and 1REQ64EN# signals operate to control the selecting of FETs T2 and T1, respectively, in the quick switch 502. Because the 1FORCELO# and 1REQ64EN# signals are logical complements, only one of the FETs T1 and T2 conducts. When the 1RST# signal is asserted, the 1FORCELO# signal is at a logically low level, and the FET T2 is biased on. Because the 1FORCELO# signal is also coupled to the drain terminal of the FET T2, the logically low level of the 1FORCELO# signal appears at the output terminal of the quick switch 502, 1_REQ64#. At the same time, the 1REQ64EN# signal is logically high, and the FET T1 does not conduct. The REQ64# signal is isolated from the output terminal of the quick switch 502.

When the 1RST# signal is deasserted, the 1FORCELO# signal goes high, and the FET T2 ceases conducting, isolating the 1FORCELO# signal from the output terminal of the quick switch 502. At the same time, the 1REQ64EN# signal goes low, and the FET T1 is biased on, connecting the REQ64# signal to the output terminal of the quick switch 502.

As is evident from the equations shown in Appendix A to this specification, the PAL device 501 ensures that, for any given PCI slot, one and only one of the mREQ64EN# and mFORCELO# signals is asserted low at any instant. Thus, either the FET T1 or the FET T2 in the quick switch 502 conducts, but the two FETs T1 and T2 will not conduct simultaneously. As a result, either the REQ64# signal or the mFORCELO# signal is passed to the output terminal of the quick switch 502 as the m_$_{REQ}$64# signal.

The devices and circuitry shown in FIG. 4 represent but one embodiment of the present invention. The invention may be embodied in other ways. For example, a state machine or other circuitry may be used in place of the PAL device 501 of FIG. 4. However, the PAL device ensures, as much as possible, that the mREQ64EN# and mFORCELO# signals are truly complementary because the delays of the two signals will track in the PAL device. Also, the use of the quick switches 502–506 having a pair of FETs and a pair of inverters helps ensure proper switching of the output between the complementary input signals. Alternatively, the functionality performed by the PAL device 501 and quick switches 502–506 of FIG. 4 may be incorporated into the PCI hot plug controller ASIC device 100 shown in FIG. 2.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

APPENDIX A

```
"*********************************************************************
**
MODULE rea64a
TITLE     PCI WREQ64_ PAL A';
req64a DEVICE 'P22V10C';   "use 7ns 5V PLCC part
"PIN DEFINITIONS
```

APPENDIX A-continued

```
"INPUTS
req64a_clk    PIN 2;     "Wide PCI Clock
!w7rst_       PIN 3;     "Slot 7 PCI reset
!w8rst_       PIN 4;     "Slot 8 PCI reset
!w9rst_       PIN 5;     "Slot 9 PCI reset
!w10rst_      PIN 6;     "Slot 10 PCI reset
!w11rst_      PIN 7;     "Slot 11 PCI reset
"spare        PIN 9;     Slot 7 Bus Enable (not used)
"spare        PIN 10;    Slot 8 Bus Enable (not used)
"spare        PIN 11;    Slot 9 Bus Enable (not used)
"spare        PIN 12;    Slot 10 Bus Enable (not used)
"spare        PIN 13;    Slot 11 Bus Enable (not used)
"spare        PIN 16;    Wide Bus PCI Reset (not used)
"OUTPUTS
!w11forcelo_   PIN 17;   "Force 11_WREQ64_ low via Quick switch
!w11req64en_   PIN 18;   "Slot 11 WREQ64_ Quick switch enable
!w10forcelo_   PIN 19;   "Force 10_WREQ64_ low via Quick switch
!w10req64en_   PIN 20;   "Slot 10 WREQ64_ Quick switch enable
!w9forcelo_    PIN 21;   "Force 9_WREQ64_low via Quick switch
!w9req64en_    PIN 23;   "Slot 9 WREQ64_ Quick switch enable
!w8forcelo_    PIN 24;   "Force 8_WREQ64_ low via Quick switch
!w8req64en_    PIN 25;   "Slot 8 WREQ64_ Quick switch enable
!w7forcelo_    PIN 26;   "Force 7_WREQ64_ low via Quick switch
!w7req64en_    PIN 27;   "Slot 7 WREQ64_ Quick switch enable
w7req64en_, w7forcelo_, w8req64en_, w8forcelo_ istype 'invert, reg_d';
w9req64en_, w9forcelo_, w10req64en_, w10forcelo_ istype 'invert, reg_d';
w11req64en_, w11forcelo_istype 'invert, reg_d';
"CONSTANTS
asserted = 1;
deasserted = 0;
Z,x,c = .Z.,.X., .C.;
"*****************************************************************
"* Set up clocks.                                                 *
"*****************************************************************
EQUATIONS
    w7req64en_.c   = req64a_clk;
    w7forcelo_.c   = req64a_clk;
    w8req64en_.c   = req64a_clk;
    w8forcelo_.c   = req64a_clk;
    w9req64en_.c   = req64a_clk;
    w9forcelo_.c   = req64a_clk;
    w10req64en_.c  = req64a_clk;
    w10forcelo_.c  = req64a_clk;
    w11req64en_.c  = req64a_clk;
    w11forcelo_.c  = req64a_clk;
"*****************************************************************
** Equations                                                      *
"*****************************************************************
EQUATIONS
    w7req64en_     := !w7rst_;    "Slot 7 WREQ64_ Quick switch bus enable
    w7forcelo_     := w7rst_;     "Force 7_WREQ64_ low via Quick switch
    w8req64en_     := !w8rst_;    "Slot 7 WREQ64_ Quick switch bus enable
    w8forcelo_     := w8rst_;     "Force 7_WREQ64_ low via Quick switch
    w9req64en_     := !w9rst_;    "Slot 7 WREQ64_ Quick switch bus enable
    w9forcelo_     := w9rst_;     "Force 7_WREQ64_ low via Quick switch
    w10req64en_    := !w10rst_;   "Slot 7 WREQ64_ Quick switch bus enable
    w10forcelo_    := w10rst_;    "Force 7_WREQ64_ low via Quick switch
    w11req64en_    := !w11rst_;   "Slot 7 WREQ64_ Quick switch bus enable
    w11forcelo_    := w11rst_;    "Force 7_WREQ64_ low via Quick switch
```

What is claimed:

1. An apparatus, comprising:

a timing circuit adapted to receive a reset signal at an input terminal and to produce first and second logic signals at first and second output terminals, the first and second logical signals being of opposite logic levels;

a switch adapted to receive the first and second logic signals and a control signal, wherein the switch is adapted to produce as an output one of the first logic signal and the control signal based on at least the first logic signal.

2. The apparatus of claim 1, wherein the timing circuit comprises a programmable array logic device.

3. The apparatus of claim 2, wherein the first logic signal has a first logic level, the second logic signal has a second logic level, and the first and second logic levels are opposite logic levels.

4. The apparatus of claim 1, wherein the reset signal has a reset logic level, and the reset logic level and the first logic level are the same level.

5. An apparatus, comprising:

a timing circuit adapted to receive a reset signal at an input terminal and to produce first and second logic signals at first and second output terminals, the first and second logical signals being of opposite logic levels;

a switch adapted to receive the first and second logic signals and a control signal, wherein the switch is adapted to produce as an output one of the first logic signal and the control signal, wherein the switch includes:
a first FET having a drain terminal coupled to the first output terminal and a gate terminal adapted to receive an inverted form of the first logic signal; and
a second FET having a gate terminal coupled to the second output terminal and a drain terminal adapted to receive an inverted form of the control signal.

6. The apparatus of claim 5, wherein the first and second FETs have source terminals coupled together to produce the output of the switch.

7. An apparatus, comprising:
means for receiving a reset signal having a reset logic level and for producing a first output signal having a first logic level and producing a second output signal having a second logic level, the reset logic level and the first logic level being the same;
means for receiving the first output signal and for producing a third output signal in response to the first output signal having a low logic level;
means for receiving the second output signal, a control signal, and for producing a fourth output signal in response to the second output signal having a low logic level.

8. The apparatus of claim 7, wherein the first and second logic levels are opposite levels.

9. An apparatus for controlling a REQ64# function for component boards in a computer system, comprising:
a signal generation circuit adapted to receive a reset signal and produce first and second signals having opposite logic levels in response thereto; and
a multiplexer adapted to receive the first and second signals and a control signal, the multiplexer being adapted to produce an output corresponding to one of the first signal and the control signal as determined by the logic level of the reset signal.

10. The apparatus of claim 9, wherein the output corresponds to the reset signal if the reset signal has a logic low level and the output corresponds to the control signal if the reset signal has a logic high level.

11. An apparatus, comprising:
a first circuit adapted to receive a reset signal and to produce a first output signal that is an inverted form of the reset signal; and
a second circuit adapted to receive the first output signal, the reset signal, and a control signal, the second circuit adapted to produce a second output signal, the second output signal corresponding to the reset signal in response to the reset signal having a logical low level, and the second output signal corresponding to the control signal in response to the reset signal having a logical high level.

12. A method for generating a signal to indicate to a component board that it is to be connected to a 64-bit data path in a computer system, comprising:
receiving a reset signal having a reset logical level;
producing a first output signal having a first output logical level that corresponds to the reset logical level;
producing a second output signal having a second output logical level that is complementary to the first output logical level;
producing a third output signal corresponding to the first output signal in response to the first output signal having a low logical level and corresponding to a control signal in response to the second output signal having a low logical level.

13. The method of claim 12, wherein the step of producing a third output signal corresponding to the first output signal comprises passing the first output signal, the first output signal becoming the third output signal.

14. The method of claim 12, wherein the step of producing a third output signal corresponding to a control signal comprises passing the control signal, the control signal becoming the third output signal.

15. A method for controlling a REQ64# signal in a computer system, comprising:
receiving a reset signal having a reset logical level;
receiving a control signal;
producing an inverted form of the reset signal, the inverted form having an inverted reset logical level;
producing the reset signal as a first output signal in response to the reset signal having a low logical level; and
producing the control signal as a second output signal in response to the reset signal having a high logical level.

16. A method, comprising:
generating first and second complementary signals from a reset signal;
receiving a control signal;
selecting one of the first complementary signal and the control signal based on the reset signal; and
generating a third signal having a logical level determined by the reset signal in response to the rest signal being asserted and the control signal in response to the reset signal being deasserted.

* * * * *